United States Patent [19]
Brunner

[11] 3,855,513
[45] Dec. 17, 1974

[54] PERFORATED-TAPE READER DRIVE SYSTEM

[75] Inventor: Julius Brunner, Nurnberg, Germany

[73] Assignee: Siemens Aktiengesellschaft, Munich, Germany

[22] Filed: Apr. 10, 1973

[21] Appl. No.: 349,699

[30] Foreign Application Priority Data
Apr. 11, 1972 Germany............................ 2217383

[52] U.S. Cl............................... 318/561, 318/618
[51] Int. Cl. ............................................. G05b 13/00
[58] Field of Search ........... 318/561, 571, 615, 616, 318/617, 618

[56] References Cited
UNITED STATES PATENTS

| | | |
|---|---|---|
| 3,241,015 | 3/1966 | Allen ................................. 318/561 |
| 3,460,013 | 8/1969 | Gaylor ............................... 318/615 |
| 3,512,060 | 5/1970 | Floyd ................................ 318/616 |
| 3,539,897 | 11/1970 | Sommeria .......................... 318/618 |
| 3,633,086 | 1/1972 | Speth ................................ 318/561 |
| 3,795,853 | 3/1974 | Whitehouse ....................... 318/618 |

Primary Examiner—Robert K. Schaefer
Assistant Examiner—John Feldhaus
Attorney, Agent, or Firm—Kenyon & Kenyon Reilly Carr & Chapin

[57] ABSTRACT

A control system for incrementally driving perforated-tape readers in which both a velocity control loop and a position control loop are provided. A speed-controllable motor is initially driven by a velocity signal until it has gone approximately one-half of a tape advance step at which point a position control signal having a specially derived shape is used to move the motor to its final desired position.

6 Claims, 6 Drawing Figures

_(3,855,513)_

PERFORATED-TAPE READER DRIVE SYSTEM

BACKGROUND OF THE INVENTION

This invention related to a control system in general and more particularly to control systems for driving perforated-tape readers. Perforated-tape readers provide a convenient means for providing data into a computer or the like. Such systems are inexpensive, simple, easy to operate and have numerous other advantages. Their main drawback is that generally, their speed cannot reach that of other input devices. One form of prior art tape reader uses electrical stepping motors to advance the tape incrementally as it is being read. Because of the relatively large mass and inertia of the rotor in such stepping motors, systems of this type can only reach a stepping speed of approximately 200 steps per minute. In addition, at high stepping speeds they have a tendency to overshoot which can be undesirable in many cases.

Another type of system uses a continuously running motor coupled to the tape, for example, by a pressure device. This type of system, particularly at high stepping speeds has difficulty in keeping accurate step positions. In addition, difficulties are encountered in cooperation of the tape drive with the drives of the supply and takeup mechanism of the perforated-tape reader. Thus, such systems must have a storage path, for example, loops between the pressure drive and the winding and the unwinding reels. Thus, it can be seen that there is a need for a tape drive system which makes maximum use of the good qualities of such tape readers and which can provide increased drive speeds.

SUMMARY OF THE INVENTION

The present invention provides such a drive system for a perforated-tape reader which provides not only high stepping speeds, but also increased accuracy. In addition, this system allows using less storage on each side of the tape driver between it and the feed and takeup spools. These results are obtained through the use of a drive system which includes both a velocity control loop and a position control loop. The velocity control loop permits initially moving at a high velocity whereupon after having gone a large way toward a new position, the position loop may be brought into play to accurately position the tape at the new position. Sensing means are provided so that, when the initial large magnitude velocity is requested via input means, a first switch will be closed permitting the velocity loop to control the motor, and, when after moving approximately halfway, in response to a changed input which is below a predetermined limit, the first switch will be opened and a second switch closed allowing the position control loop to bring the motor to its final position. With this type of system, stepping speeds of approximately 500 steps per second are obtainable.

The position control loop uses a specially formed wave shape derived from signals obtained from a transmitter coupled to the drive sprocket, to both assure accurate positioning and to develop output pulses which can be used to control the desired input velocity.

DETAILED DESCRIPTION OF THE PREFERRED EMBODIMENT

Figure 1:
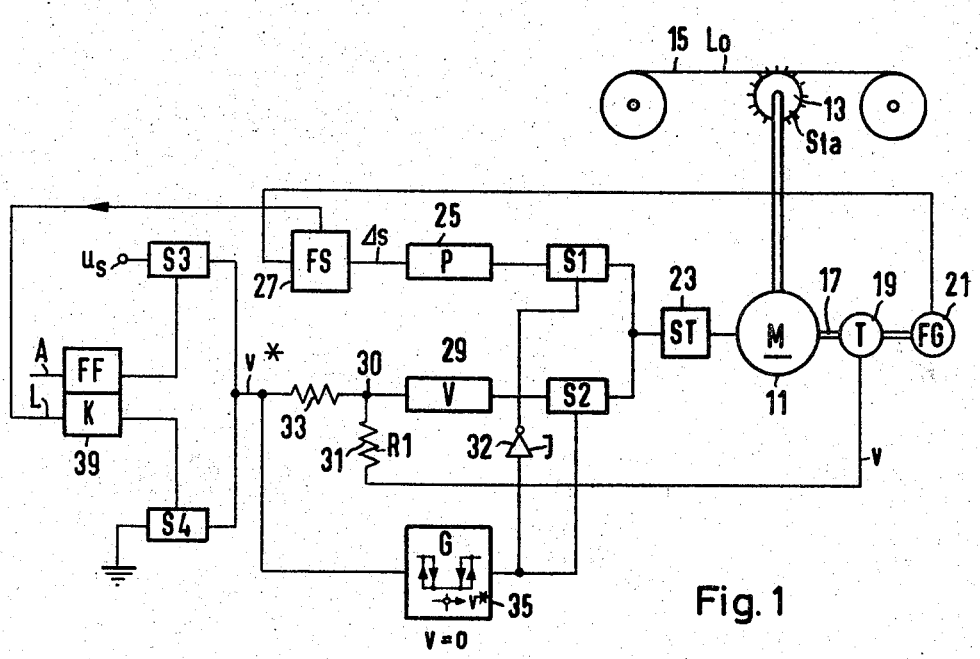
FIG. 1 is a block-schematic diagram of the preferred embodiment of the perforated-tape drive system of the present invention.
Figure 2A:
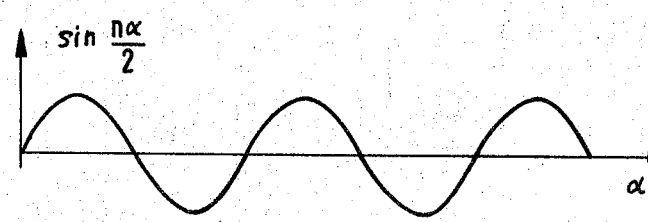
FIGS. 2a and 2b are wave form diagrams illustrating the signals used to develop the wave form of FIG. 2.
Figure 3:
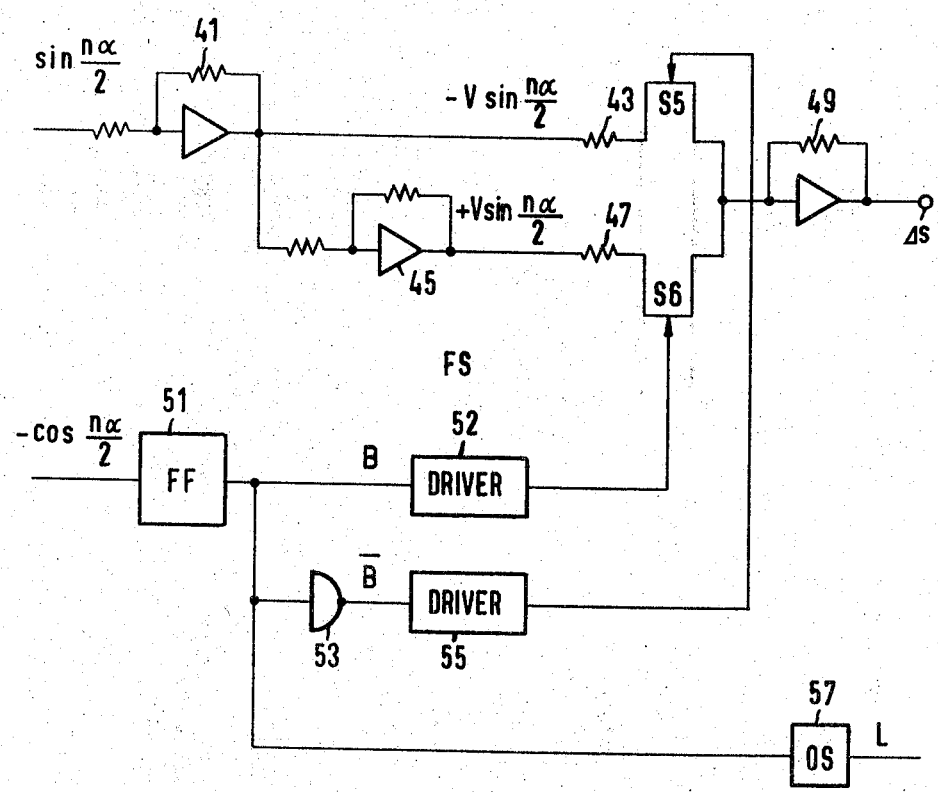
FIG. 3 is a circuit diagram of a circuit for forming the wave form of FIG. 2 and the pulses of FIG. 2c.

As shown on FIG. 1, a motor 11, which is a speed-controllable dc motor is directly coupled to a sprocket 13 which engages the perforated-tape 15. Motor shaft 17 also has coupled to it a tachometer 19, which will provide a voltage output proportional to the motor speed, and a function generator 21 to be described below. Motor 11 will be selected to be a motor having a rotor with a very small mass and inertia. The function generator 21 will develop the signals shown on FIGS. 2a and b. Motor 11 is driven by a conventional servo drive circuit 23 which will comprise servo amplifiers and compensation circuits constructed in a well known manner. The input to the drive circuit 23 is provided either by a switch S1 or a switch S2. Switch S1 has as its input an angular position control block 25 to be described below which receives its input from a function generator 27 to be described in detail below in connection with FIG. 3. Position control 25 will comprise conventional servo amplifier circuits to take the signal developed in the block 27 and provide it in a proper form and at a proper voltage level to the drive circuit 23.

Switch S2 has as its input the output of a velocity control 29. Velocity control 29 has at its input a summing junction 30 at which a feed back signal from tachometer 19 through a resistor 31 is summed with a desired input signal velocity signal provided through resistor 33. Velocity control 29 will similarly comprise well known servo amplifiers and so on for summing the signals provided at input junction 30 and providing an output to controller 23. The above described position and velocity controls 25 and 29 respectively are essentially the same as the circuit arrangement 21 disclosed in U.S. Pat. No. 3,512,060. Terminal 20 of block 29 corresponds to the summing point of the arrangement in that patent. With reference to block 25, the value $\Delta$ shown thereon compares to the zero value shown in FIG. 2 of the illustrated function of the control in that patent.

Switches S1 and S2 are controlled by the output of a comparator block 35. Block 35 will provide an output at one level in response to an input exceeding a predetermined value and at a second level in response to an input signal below that predetermined value. The input to block 35 is provided from the input to resistor 33 and is the desired velocity. One output of block 35 is provided directly to S2 and the second output provided through an inverter 37 to switch S1. Thus, for a first level of block 35, switch S2 will be closed and S1 will be opened. When the level changes, S2 will be opened and S1 closed. The input to resistor 33 and to block 35 is provided from either switch S3 or S4 which are controlled by a flip-flop 39. Switch S3 has as its input a voltage $U_s$ and switch S4 as its input a ground. Flip-flop 39 will set turning on switch S3 and opening switch S4 in response to an input on line A, and will reset closing switch S4 and opening switch S3 in response to an L signal input which is obtained from block 27 in a manner to be described below.

The circuit operation may best be understood by an example of how it responds to advance the tape. Assume that the sprocket wheel is in a position K $[2\pi/N]$ where N is the number of sprocket positions and K equals 1, 2,... N. When it is desired to advance the sprocket 1 position, i.e., from K to K + 1, a demand pulse is provided on line A to set flip-flop 39. This will cause switch S3 to be closed and S4 to be opened, and will cause voltage $U_s$ to be provided to the velocity control 29, through resistor 33. At the same time, the voltage $U_s$, which is selected to exceed the predetermined voltage of block 35, will cause comparator 35 to have an output which will close switch S2 and open switch S1. This will permit the output of velocity control 29 to be provided through the drive circuit 23 to drive motor 11. Motor 11 will come up to a speed which corresponds to the input voltage $U_s$ in a well known manner with tachometer 19 providing the feedback signal to null the system. When the sprocket has travelled approximately half of the distance it must go, i. e., $K + \frac{1}{2}$ $[2\pi/N]$, an output from block 27, to be described below, will provide a reset pulse on line L resetting the flip-flop 39. This will cause switch S3 to open and S4 to close and provide a ground to resistor 33 and block 35. Since this level is below the predetermined value of block 35, its output will switch and cause switch S1 to be closed and switch S2 to be opened. This now couples the output of the position control 25 through S1 to the drive circuit 23. The feedback from function generator 21, through the function block 27, will cause the motor to null at the desired sprocket position.

Figure 2:
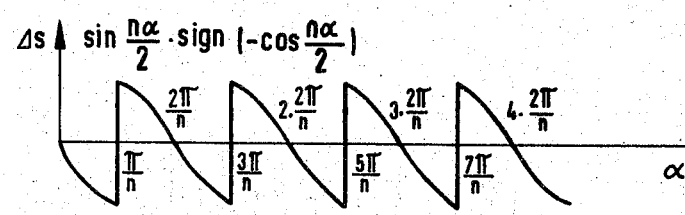
FIG. 2 is a wave form diagram of a preferred control signal for use in the position loop of FIG. 1.
Figure 2B:
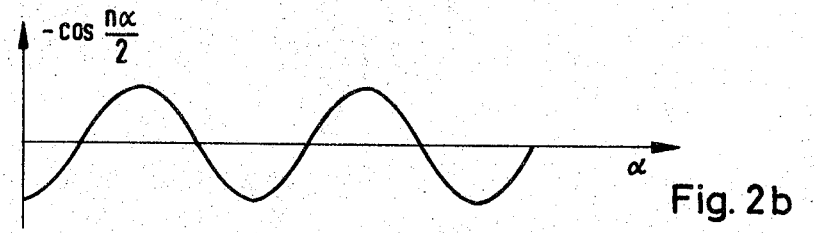

Each time the sprocket is required to advance a step, an additional pulse will be provided on Line A. Thus, when the tape is being read at its maximum velocity, for each step the motor will be accelerated and decelerated with a new signal occurring immediately thereafter. In such a case the average velocity of the motor will reach its maximum value, which maximum value will tend to approach the maximum velocity value which corresponds to the full voltage $U_s$. The wave form which is provided as an input to the position control 25 is shown on FIG. 2. It is equal to the sin $N\alpha/2 \times$ sin [cos $N\alpha/2$ where $\alpha$ equals the angular position and N equals the number of detent positions on the sprocket. This signal is developed by a function generator 21, which may comprise a periodically magnetized magnet disc having N/2 segments in conjunction with two specially fixed Hall effect generators. The circuit used to develop the signal of FIG. 2 is shown on FIG. 3. Sin $N\alpha/2$ is provided to an amplifier 41 which will output a voltage equal to $-V$ sin $N\alpha/2$. This output is provided through a resistor 43 to a switch S5 which may comprise a field effect transistor. The output of amplifier 41 is also provided to a unity gain amplifier 45 where it will be inverted to provide an output equal to $+V$ sin $N\alpha/2$. This value is provided through resistor 47 to a second field effect transistor switch S6. The outputs of the switches S5 and S6 are provided to a further amplifier 49 which provides the final circuit output and which will be the input to block 25 of FIG. 1. Control of the sign of the signal is provided by the cosine signal which is the input to a flip-flop 51. Flip-flop 51 is arranged so that each time the cosign signal of FIG. 2(b) crosses zero it will be triggered to change state. The output of the flip-flop designated B is provided to a first driver 52 and to a gate inverter 53, thereby providing complementary outputs. The output of gate 53 is provided to a second driver 55. Drivers 53 and 55 respectively drive the switches S6 and S5. Thus, each time the sign of the cosign signal changes, the output from flip-flop 51 indicated by the line B and the B output of gate 53 will reverse causing one or the other of the drivers 52 and 55 to open their respective switches. The resulting output is the wave form shown on FIG. 2. The discontinuous portions of this wave form can be used to provide the L input to flip-flop 39 shown by the pulses of FIG. 2c.

Figure 2C:
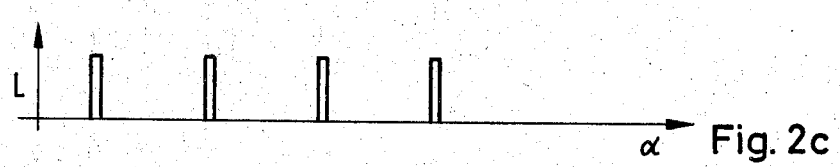
FIG. 2c is a wave form diagram illustrating control pulses which may be generated from the wave form of FIG. 2.

A one shot multivibrator 57 is coupled to the output of the flip-flop 51 and adapted to provide an output pulse each time the level on line B changes, thereby providing the output pulses shown on FIG. 2c.

Examination of FIG. 2 will show that the zero crossing points of the wave form of FIG. 2 are at $\pi/n$; $2\pi/n$; $3\pi/n$; $2 \cdot 2\pi/n$; $5\pi/n$; $3 \cdot 2\pi/n$; $7\pi/n$; $4 \cdot 2\pi/n$; of these only the evencrossing points are stable. After switching to the position loop the motor will be positioned in one of the continuous areas of the wave form and will drive until it reaches the closed even zero crossing point. For example, assume the motor is stopped at $2\pi/n$. The voltage out of block 27 will be zero as will the voltages out of blocks 25 and 23 and the motor will remain stopped. Any tendency for the motor to move off this position will result in a voltage which will tend to drive it back. Now, if an advance pulse is put into flip-flop 39 of FIG. 1 the velocity control will start moving the motor toward the position $2 \cdot 2\pi/n$. When it is halfway there a pulse from one shot 57 will occur to reset flip-flop 39 and switch to position control. The motor will be past the discontinuity at $3\pi/n$, i.e., on the continuous part of the curve and will drive until it reaches to zero level at $2 \cdot 2\pi/n$.

Thus an improved drive system for a tape reader has been shown. It will be recognized by those skilled in the art that this drive system may also be used with other types of position controls and that a different type of angle transmitter having a similar output wave form may be used. These and other modifications may be made without departing from the spirit of the invention which is intended to be limited solely by the appended claims.

What is claimed is:

1. A drive system for a perforated tape reader in which the tape is driven by a sprocket comprising:
   a. a speed controllable dc motor coupled to the sprocket;
   b. means to develop a position control signal;
   c. means to develop a velocity control signal;
   d. means to selectively couple one of said position and velocity control signals to said motor in response to an input level, said velocity signal being coupled in response to an input level above a predetermined value and said position signal in response to an input level below said predetermined level, and
   e. means to provide an input level to said coupling means.

2. The invention according to claim 1 wherein said means to develop a velocity control signal comprise a tachometer coupled to the shaft of said motor and means to sum said tachometer signal with said input level to develop an output signal.

3. The invention acccording to claim 2 wherein said position control means comprise function generation means coupled to the shaft of said motor and adapted to provide an output which is stable at each detent position of the sprocket and means to provide said signal through said coupling means to said motor.

4. The invention according to claim 3 wherein said function generation means comprise:
   a. means to generate signals proportional to sin ($n\alpha/2$) and -cos($n\alpha/2$); and
   b. means to combine the signals sin($n\alpha\alpha/2$ and -cos($n\alpha/2$) to develop a signal proportional to sin($n\alpha/2$) times the sign of (-cos($n\alpha/2$) where $\alpha$ is the angular position of said sprocket and $n$ is the number of steps per revolution of said sprocket.

5. The invention according to claim 4 and further including:
   a. means responsive to a set signal to provide a first level above said predetermined level as said input level and in response to a reset input a second level below said predetermined level as said input level; and
   b. means to provide a pulse output to said reset input each time the sign of (-cosine ($n\alpha/2$) changes, whereby by setting said means said motor will initially be driven through a velocity control loop and upon (-cos($n\alpha/2$) crossing zero when the motor has moved one half step will then be switched to the position control loop.

6. The invention according to claim 4 wherein said means to generate comprises a magnetized disk having $n/2$ segments coupled to said sprocket and two fixed Hall effect generators placed to be influenced by said disk, said generators being displaced 90 electrical degrees from each other.

* * * * *

UNITED STATES PATENT OFFICE
CERTIFICATE OF CORRECTION

Patent No. 3,855,513        Dated December 17, 1974

Inventor(s) Jilius Brunner

It is certified that error appears in the above-identified patent and that said Letters Patent are hereby corrected as shown below:

In column 3, line 46, change "sin $N\alpha/2$ x sin[cos $N\alpha/2$" to

--sin $N\alpha/2$ x sin [cos $N\alpha/2$]-- in column 5, line 11, change "sin $(n\alpha\alpha/2$ and  -cos $(n\alpha/2)$"

to --sin $(n\alpha/2)$ and -cos $(n\alpha/2)$--

Signed and sealed this 4th day of March 1975.

(SEAL)
Attest:

RUTH C. MASON
Attesting Officer

C. MARSHALL DANN
Commissioner of Patents
and Trademarks